July 23, 1957  D. E. SHARP  2,800,175

FIRING TANK FURNACES

Filed June 11, 1949  2 Sheets-Sheet 1

Inventor
Donald E. Sharp
By Nobbe & Swope
Attorneys

July 23, 1957　　　D. E. SHARP　　　2,800,175
FIRING TANK FURNACES

Filed June 11, 1949　　　2 Sheets-Sheet 2

Inventor
Donald E. Sharp
By
Nobbe & Swope
Attorneys

United States Patent Office 2,800,175
Patented July 23, 1957

2,800,175

FIRING TANK FURNACES

Donald E. Sharp, Maumee, Ohio, assignor to Libbey-Owens-Ford Glass Company, Toledo, Ohio, a corporation of Ohio Application June 11, 1949, Serial No. 98,423

9 Claims. (Cl. 158—117.5)

The present invention relates to the firing of tank furnaces, and more particularly to the firing of tank furnaces of the type generally used in the melting of glass.

Briefly stated, the invention contemplates firing a tank furnace of this character with an oxygen-fuel gas flame. More specifically, it contemplates firing a tank furnace with an oxygen-fuel gas flame, and introducing at least some of the products of combustion of such a flame, which are primarily carbon dioxide and water, into the oxygen and/or fuel, prior to combustion, to increase the length and luminosity of the resulting flame.

The tank furnaces that are customarily used for melting glass for containers, for sheet and plate glass, or for other mass production of glass, for example, are very large structures which require vast quantities of fuel merely to supply the losses of heat from the walls. In fact, the fuel load for an idle furnace, merely to maintain temperatures, is of the order of 75% of the fuel required when the furnace is producing its normal output of glass.

It will be evident from this that, heretofore, the amount of fuel that has been utilized for actually making the glass was only a relatively small part of the enormous amount required, because a very large proportion of the whole was necessary solely for supplying heat that was lost through the walls and stack of the furnace.

In addition, air has been generally used for combustion of the fuel and, because of the high temperatures that must be employed in glass making, it is necessary to preheat this air. If this is not done, the quantity of fuel required will be enormously greater, and the temperatures obtainable will be much lower. In order to accomplish this preheating of the air, regenerators are most often employed. These, in themselves, are very large and expensive structures. Moreover, there is much inert nitrogen present in air (approximately 80%), and this must be heated to the full temperature of the furnace, and ultimately thrown away out of the stack at a fairly high temperature, in order to obtain the amount of oxygen necessary for proper combustion of the fuel.

To better illustrate these points, I find that the heat loss up the stack in an air-fuel gas fired furnace, approximates 20 to 25% of the total heat evolved in the combustion of the fuel; and that the heat loss from the walls of regenerators alone approximates 10% of the total heat.

In melting glass in a tank furnace, the transfer of heat from the flames to the furnace is accomplished by radiation and by conduction-convection processes. The degree of transfer by radiation depends on the quantity of carbon dioxide and of water vapor in the burning gases, because nitrogen, hydrogen, carbon monoxide and oxygen have little, if any, radiating effect. Efforts have been made to increase the radiating power of air-gas flames by introducing some of the spent flue gases along with the combustion air for the purpose of fortifying the flames with gases such as carbon dioxide and water vapor which are normally present in the flue gases. The difficulty with this however is that, for every part of carbon dioxide or water vapor so introduced, it is necessary to reintroduce 5 to 6 times as much nitrogen, and this nitrogen not only serves no direct purpose but also abstracts heat from the fuel and passes it on out of the stack.

It is therefore an important aim of this invention to fire a tank furnace with a type of flame that will permit the size of the furnace structure to be reduced, with a consequent reduction of heat loss, and without lowering the output of the furnace.

Another object is the provision of a type of flame for use in firing tank furnaces which will make it possible to eliminate regenerators, recuperators, and/or superheaters; to reduce stack losses, and to otherwise bring about substantial savings in fuel.

Another object is to provide a method of firing tank furnaces which will utilize the efficiency of radiant combustion to the fullest extent, and whereby flame temperatures will be increased without disadvantageous local heating.

Another and more specific object is the provision of a method of firing tank furnaces which utilizes oxygen instead of, or in combination with, air for combustion.

Still another object is to provide, in a tank furnace firing method of the above character, which utilizes an oxygen-fuel gas flame, the step of enhancing the radiating powers of the flame by the introduction of carbon dioxide and/or water vapor, and particularly the carbon dioxide and water vapor obtained as products of combustion from such a flame.

Other objects and advantages of the invention will become more apparent during the course of the following description, when taken in connection with the accompanying drawings.

In the drawings, wherein like numerals are employed to designate like parts throughout the same:

In firing a tank furnace by the method of this invention, I prefer to use substantially pure oxygen instead of air for the combustion of the fuel. By this means the vast quantities of nitrogen which always accompany the necessary oxygen in air, and which must be heated to the full temperature of the furnace, are eliminated. This makes it possible to dispense with regenerators and the like, and the disadvantages that accompany the use of such structures. Moreover, in combusting fuel with oxygen, the stack gases, or products of combustion consist practically entirely of carbon dioxide and water vapor in roughly equal quantities, instead of containing about 70% nitrogen as is ordinarily the case in firing tank furnaces in which air is used for combustion.

There is one possible objection to the use of an oxygen-fuel flame, as such, for firing tank furnaces in which glass, for example, is to be melted, and this is that, when combusting natural gas (or other fuel) with oxygen, a very short and very hot flame normally results; and length and luminosity are ordinarily considered to be two important requisites in a glass melting flame, in order to provide the soaking type of heat from radiation that is necessary to put the batch mix into complete solution.

However, I have discovered that the length and luminosity of these oxygen-fuel flames can be greatly increased by introducing either carbon dioxide or water vapor or both into the oxygen and/or fuel gas before combustion takes place. And I have also found that, since the products of combustion of my oxygen-fuel flame consist practically entirely of carbon dioxide and water, I can, by recirculating a part of the flue gases and mixing them with the oxygen and/or fuel gas, greatly increase the relative amount of $CO_2$ and $H_2O$ in the burning gases, and in this way obtain a much longer flame and one which transfers relatively more heat by radiation.

A further advantage of this mixture of oxygen and flue gases with conventional fuel, in addition to the fact that it produces a relatively long and radiant flame, is that combustion is retarded by the presence of either the carbon dioxide or water vapor or both, so that the heat is not released close to the burners but is spread out over a relatively wide area.

Figure 1:
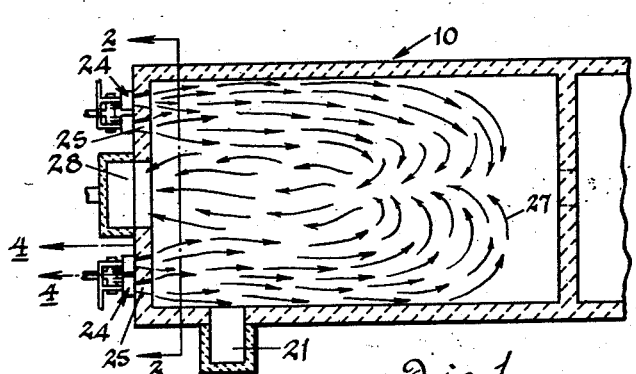
Fig. 1 is a sectional, plan view of the melting end of an end fired, glass tank furnace, showing a central exhaust port and burners for producing the special oxygen-fuel gas flame of the invention at either side of the central port.
Figures 2, 11:
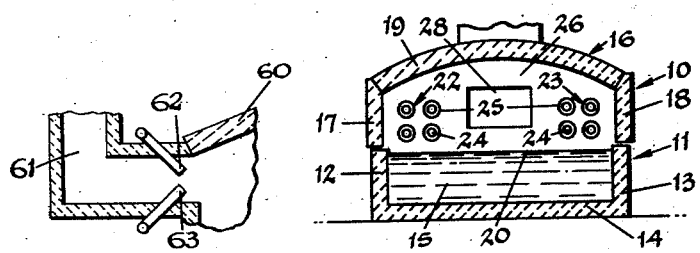
Fig. 2 is a transverse sectional view taken substantially along the line 2—2 in Fig. 1.
Fig. 11 is a fragmentary transverse sectional view of a regenerative type of furnace in which oxygen is added to the air-fuel mixture.

Referring now more particularly to the drawings, there is disclosed in Figs. 1 and 2 a glass melting furnace embodying my invention. As shown, the furnace is of conventional type except that it is fired continuously from the closed end instead of intermittently from alternate sides. This melting furnace, which is designated in its entirety by the numeral 10, is made up of a lower portion 11, formed by side walls 12 and 13 and bottom wall 14, within which a supply of molten glass 15 is contained; and a top portion 16, comprising breast walls 17 and 18 and a crown 19, above the glass line 20.

Because, in this particular embodiment, the furnace is to be fired from the end, a conventional dog house 21 is arranged to communicate with the lower portion of the furnace through one of the side walls 12, in order to provide for the introduction of raw glass making materials, or batch, into the melting chamber.

The firing of the furnace is accomplished by banks 22 and 23 of special burners 24, arranged adjacent the opposite breast walls 17 and 18, to play flames into the upper portion of the tank furnace 10 through burners ports 25 in the end wall 26. The flames from the burners 24 will follow the directions of the arrows 27 in Fig. 1 and the products of combustion will be exhausted through the port 28 in the end wall 26.

Figure 4:
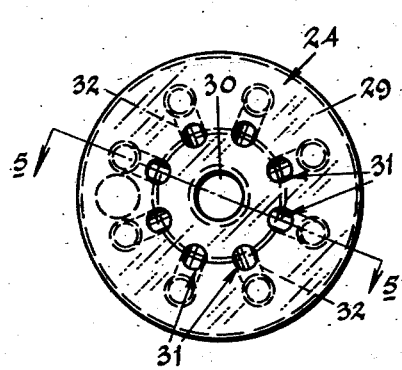
Fig. 4 is an end or face view of one form of burner designed to create the oxygen-fuel gas flame of the invention.
Figure 5:
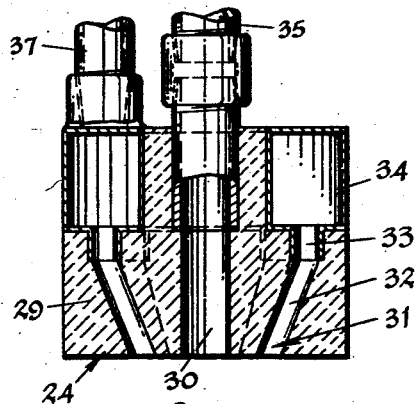
Fig. 5 is a section taken substantially along the line 5—5 in Fig. 4.

One form of burner which may be advantageously used in firing tank furnaces by my novel method is shown in Figs. 4 and 5 of the drawings, and comprises a substantially cylindrical body portion 29 of a highly refractory material. Arranged centrally of the body portion 29 is a cylindrical gas passageway 30 extending therethrough. Surrounding the gas passageway 30 are a series of relatively smaller cylindrical oxygen passageways 31, having angled portions 32 leading from the face of the burner 24 and angling away from the gas passageway 30 to a straight portion 33, which communicates with an annular oxygen manifold 34 inset into the rear face of the burner. The oxygen manifold 34 is preferably in the form of a metal casing enclosing a manifold chamber which, in burning natural gas, has a cross sectional area that is preferably approximately twice the area of the gas passageway 30.

Figure 3:
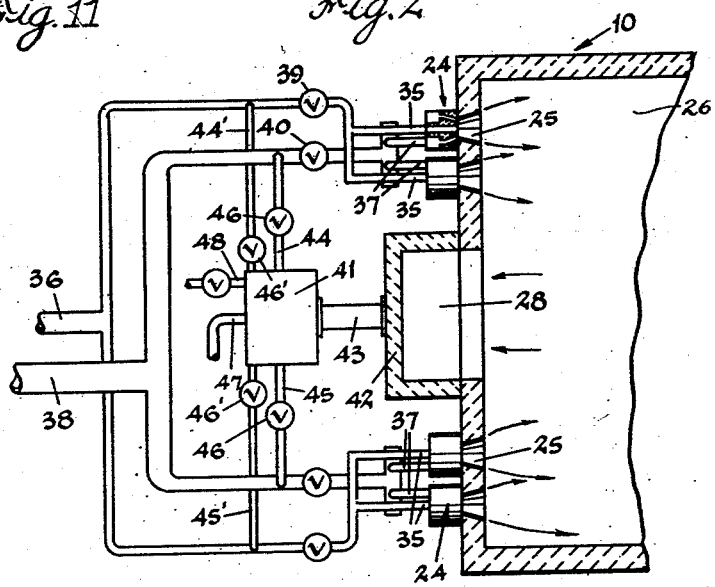
Fig. 3 is an enlarged, fragmentary view of the firing end of the tank furnace of Fig. 1, showing the supply piping system for the burners.

Burners 24 of the character just described can be associated with the burner ports 25 in the end wall 26 of the furnace in the manner best shown in Fig. 3. Natural gas, or other suitable fuel gas is fed to the gas passageways 30 of the burners 24 through branch pipes 35 of a main supply pipe 36 leading from a source of gas (not shown), and oxygen is supplied to the manifolds 34 of the burners 24 by branch pipes 37 of a main oxygen supply pipe 38 which is connected to a source of oxygen (also not shown).

The gas and oxygen fed to the burners 24 can be controlled to give the proper mixture and amount by means of the valves 39 and 40 in the main fuel and oxygen supply lines 36 and 38 respectively, and/or by similar valves which may be inserted in the branch pipes 35 and 37 if desired. Once the flames have been lit at the burners 24, the firing of the furnace will be continuous.

As pointed out above, however, the burning of gas with oxygen normally gives a short, intensely hot flame, and it is desirable in the melting of glass to provide a relatively long and luminous flame. According to this embodiment of the invention, I accomplish this by bleeding back into the oxygen and/or fuel line some of the products of combustion that would normally go out the stack, for the purpose of introducing carbon dioxide, or carbon dioxide and water vapor, which are the primary ingredients present in the flue gases, into the final combustible oxygen-fuel gas mixture.

One suitable means for accomplishing this is illustrated in Fig. 3, and comprises a combined condenser and blower unit 41 which communicates, through a conduit 43, with a flue 42 leading from the exhaust port 28 to a stack (not shown). The exhaust side of the unit 41 is connected to the main oxygen supply line 38 through conduits 44 and 45, and to the main fuel supply line 36 through conduits 44' and 45'. Valves 46 and 46' are interposed in these conduits 44 and 45 and 44' and 45' respectively, to permit the flue gases to be fed to either the oxygen or to the fuel line or to both, and also to control the amount of flue gases that are fed into the oxygen and/or fuel supplied to the burners 24.

In cases where it is desired to feed only carbon dioxide to the oxygen and/or fuel supply pipes, for the purpose of increasing the length and luminosity of the flame and to retard combustion, the water vapor may be condensed out of the flue gas drawn from the flue 42, within the unit 41, and by-passed out of the unit through the pipe 47. Similarly, if it is desired to reduce the amount of water vapor present in the products of combustion the required amount only may be condensed out.

As an incidental feature of the invention, any excess of carbon dioxide which is not put back into the oxygen line to improve the flame characteristics may be by-passed out of the unit 41 through the conduit 48 and sold as a by-product, such as Dry Ice. Also, the recovery of waste heat in a system such as described here, where none of the heat from the products of combustion is used for preheating air as is the case in a regenerator system, can be practiced to advantage.

The invention has been specifically described in connection with the burning of gas as the fuel, and ordinarily I prefer to use natural gas because of its low cost and availability. However, the invention is equally well adapted to the burning of other types of gaseous fuels. The amount of oxygen used for combusting any particular kind of fuel gas will depend on the hydrogen:carbon ratio in the fuel. Generally speaking, the lower the heat value of the gas the lower the oxygen ratio. For example, I have found that in burning natural gas a mixture of slightly over two volumes of oxygen to one volume of gas gives very good results, while in burning coke oven gas the required amount of oxygen to give best results may vary from one-half to one volume of oxygen, to one volume of gas, depending on the hydrogen: carbon ratio in the gas.

The amount of flue gases (carbon dioxide, with or without water vapor) required to give the desired results will also vary with conditions. As indicated above, either carbon dioxide or water vapor, or a mixture of the two, can be used to increase the length and luminosity of the oxygen-gas flame, and to retard combustion, with equally good results. A mixture of the two is usually preferred because it is available as a mixture in the flue gases from the flame and, when only one is employed, carbon dioxide is most readily available because water vapor can be easily condensed from the flue gases while it is virtually impossible to remove the carbon dioxide.

In any event, however, the amount of carbon dioxide and/or water vapor that is added to the combustible oxygen-gas mixture will depend on the length and luminosity desired in the flame. To obtain a longer and more luminous flame more carbon dioxide and/or water vapor is added, while to reduce the length and luminosity of the flame the amount of flue gases, or of one or the other of the principal constituents thereof, is reduced. In firing an end fired tank furnace in the melting of glass, the presence of from 10% to 30% of flue gases in the oxygen-fuel gas-flue gas mixture will ordinarily produce a flame of the required length and luminosity.

As has been indicated above, either carbon dioxide or water vapor, or a mixture of the two, or a gas such as flue gas which contains one or both of them, may be added to the oxygen or to the gas, or to both of these ingredients that make up the combustible mixture, before they reach the burner, for the purpose of lengthening and increasing the luminosity of the flame, and to retard combustion.

As an alternative, the flame extending and luminosity increasing substance may be added to the oxygen and/or fuel gas within the burner. Or, such substance may be introduced into the streams of oxygen and fuel gas as they are discharged from the burner.

Figures 9, 10:
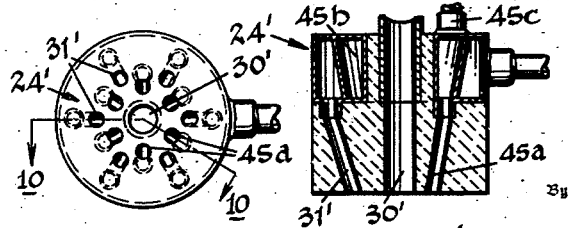
Fig. 9 is an end or face view of a modified form of burner designed to produce a long, luminous oxygen-fuel gas-flue gas flame.
Fig. 10 is a section taken substantially along the line 10—10 in Fig. 9.

A burner designed to carry out this latter practice is shown in Figs. 9 and 10 and designated in its entirety by the numeral 24'. The burner 24' is similar in construction the burner 24 of Figs. 4 and 5 except that there is interposed between the annular ring of oxygen passageways 31' and the central gas passageway 30' a second annular ring of passageways 45a leading from a manifold 45b which is connected through the conduit 45c to a source of carbon doixide and/or water vapor (not shown).

The principal advantage of this arrangement is that the streams of carbon dioxide and/or water vapor, issuing from the passageways 45a, will lie between the streams of oxygen and fuel gas issuing from the passageways 31' and 30' respectively, with the result that mixing of the oxygen and fuel gas will be retarded so that combustion takes place away from the burner and the heat of the flame will be spread over a larger area.

Figure 6:
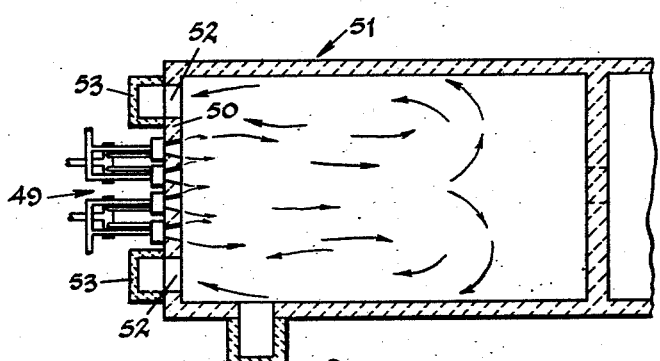
Fig. 6 is a sectional plan view of the melting end of a modified form of end fired tank furnace, showing exhaust ports at the sides, and burners located between the exhaust ports.

Obviously, the special firing method and apparatus described above may be used in other ways than that disclosed in Figs. 1 and 2. For example, in Fig. 6 there is shown a specifically different end fired type of tank furnace in which a single bank 49 of burners 24 are arranged centrally of the end wall 50 of the furnace 51, and the products of combustion are drawn out through the exhaust ports 52 and flues 53.

Figure 7:
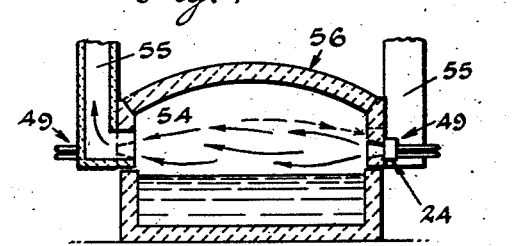
Fig. 7 is a transverse section through another modified form of glass tank furnace having a port and burner arrangement which permits firing from both sides of the furnace at one time.

In Fig. 7 is shown a side fired type of tank furnace in which burners 24 alternate with exhaust ports 54 and flues 55 along both sides of the furnace 56. The flues and ports are so arranged that there is an exhaust port 54 and a connecting flue 55 opposite each burner or bank of burners 24. This is somewhat similar to conventional types of side fired furnaces, but, with the arrangement of the invention, there will be continuous firing from both sides instead of intermittent firing of the furnace first from one side and then from the other.

In this connection, too, it should be mentioned that the present invention also contemplates the use of regular regenerative or recuperative types of furnaces, such as furnace 60 shown in Fig. 11, in which air from the flue 61 is used in combusting the fuel, supplied through injector nozzle 62, but in which, according to this invention, a substantial proportion of oxygen is added through injector nozzle 63 to the air used for supplying the balance of the oxygen used for combustion. In this case, also, a portion of the products of combustion are continuously withdrawn and mixed with the air, oxygen or fuel prior to or substantially at the time combustion is initiated, in a manner similar to that shown in Fig. 3. While this method is somewhat less efficient than the preferred form of employing substantially pure oxygen for combustion of the fuel, it will have the same advantages, even if in a somewhat lesser degree, and will substantially reduce the enormous proportion of nitrogen that must normally be circulated and heated in conventional systems, with a corresponding saving in size of furnace structure.

In adding oxygen to a combustible air-fuel mixture, according to the invention, it is desirable to increase the oxygen content of the air by at least 50% in order to obtain notable results. In other words, the proportion of oxygen to nitrogen in air is normally approximately 20 to 80, and I prefer to add sufficient oxygen to increase this to at least 30 parts of oxygen to 70 parts nitrogen. Better results are obtained, however, when the amount of oxygen is increased to give from 40 parts upward of oxygen from 60 parts downward of nitrogen.

Figure 8:
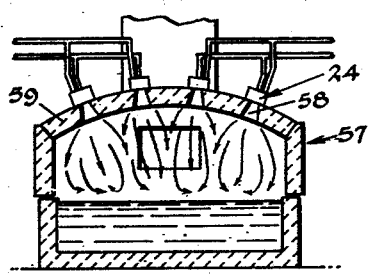
Fig. 8 is a transverse sectional view through still another modified form of tank furnace, showing a battery of burners in the crown exhausting to a single port in the rear gable wall.

In Fig. 8 there is illustrated a crown fired tank furnace 57 in which the burners, or banks of burners 24, are positioned to direct the flames downwardly through burner ports 58 in the crown 59 of the furnace. This type of furnace can be fired with the oxygen-fuel-flue gas flames described in detail above, but also has the additional feature of being a practical construction for use with the short, intensely hot fires that are characteristic of oxygen-fuel flames whose length and luminosity have not been increased by the addition of carbon dioxide, or carbon dioxide and water vapor.

It is to be understood that the forms of the invention herewith shown and described are to be taken as illustrative embodiments only of the same, and that various changes in the shape, size and arrangements of parts, as well as various procedural changes, may be resorted to without departing from the spirit of the invention or the scope of the subjoined claims.

I claim:

1. In a method of melting and conditioning a meltable material such as glass in a tank furnace, the step of burning a mixture of substantially pure oxygen and natural gas in substantially equal parts to which has been added some of the products of the combustion of said mixture above the material in said furnace, said products of combustion comprising essentially carbon dioxide and water.

2. In a method of melting and conditioning a meltable material such as glass in a tank furnace, the step of burning a mixture of substantially pure oxygen and coke oven gas in proportions of substantially one-half to one volume of oxygen to one volume of gas, to which has been added some of the products of the combustion of said mixture above the material in said furnace, said products of combustion comprising essentially carbon dioxide and water.

3. In a method of melting and conditioning a meltable material such as glass in a tank furnace, the step of burning a mixture consisting of substantially pure oxygen, fuel gas and from 10 to 30% of the products of the combustion of said mixture above the material in said furnace, said products of combustion comprising essentially carbon dioxide and water.

4. In a method of firing a tank furnace, the steps of introducing a stream of fuel gas into said furnace, introducing streams of substantially pure oxygen into said furnace in surrounding relation only to said stream of fuel gas, and burning said gas in the presence of said oxygen.

5. In a method of firing a tank furnace, the steps of introducing a stream of fuel gas, a stream of oxygen and a stream of at least some of the products of the combustion of said fuel gas, oxygen and products of combustion into said furnace, said products of combustion comprising essentially carbon dioxide and water, said last-mentioned stream being introduced between the stream of fuel gas and the stream of oxygen, and burning said fuel gas in the presence of said oxygen and products of combustion.

6. In a method of firing a tank furnace, the steps of introducing a stream of fuel gas into said furnace, introducing streams of oxygen into said furnace in surrounding relation to said stream of fuel gas, introducing streams of at least some of the products of the combustion of said fuel gas in the presence of said oxygen and said products of combustion between said stream of fuel gas and said streams of oxygen, and burning said fuel gas in the presence of said oxygen and products of combustion.

7. In a method of firing a tank furnace, the steps of introducing a stream of fuel gas into said furnace, introducing streams of oxygen and products of combustion comprising essentially carbon dioxide and water, said oxygen and said products of combustion being introduced into said furnace in surrounding relation to said stream of fuel gas, and burning said gas in the presence of said oxygen and said carbon dioxide and water.

8. In a method of firing a tank furnace, the steps of introducing a stream of fuel gas into said furnace, introducing streams of oxygen into said furnace in surrounding relation to said stream of fuel gas, introducing at least some of the products of combustion of said fuel gas and said oxygen into said stream of fuel gas, said products of combustion comprising essentially carbon dioxide and water, and burning said fuel gas in the presence of said oxygen and said carbon dioxide and water.

9. In a method of firing a tank furnace, the steps of introducing a stream of fuel gas into said furnace, introducing streams of oxygen into said furnace in surrounding relation to said stream of fuel gas, introducing at least some of the products of combustion of said fuel gas and said oxygen into said stream of fuel gas and said streams of oxygen, said products of combustion comprising essentially carbon dioxide and water, and burning said fuel gas in the presence of said oxygen and said carbon dioxide and water.

References Cited in the file of this patent

UNITED STATES PATENTS

| Number | Name | Date |
|---|---|---|
| 747,312 | Axtell | Dec. 15, 1903 |
| 881,724 | Schmidt et al. | Mar. 10, 1908 |
| 994,407 | Jaubert | June 6, 1911 |
| 1,500,651 | Smith | July 8, 1924 |
| 1,659,869 | Gow | Feb. 21, 1928 |
| 1,896,910 | Merkt | Feb. 7, 1933 |
| 2,016,458 | Schwalbe | Oct. 8, 1935 |
| 2,056,531 | Morton | Oct. 6, 1936 |
| 2,132,551 | Wood | Oct. 11, 1938 |
| 2,147,925 | Schwalbe | Feb. 21, 1939 |
| 2,149,980 | Paret | Mar. 7, 1939 |
| 2,171,597 | Parker | Sept. 5, 1939 |
| 2,258,515 | Mowat | Oct. 7, 1941 |
| 2,308,902 | Weller | Jan. 19, 1943 |
| 2,446,511 | Kerry et al. | Aug. 3, 1948 |
| 2,660,235 | Patterson | Nov. 24, 1953 |